United States Patent [19]

Rutherford et al.

[11] Patent Number: 4,949,273
[45] Date of Patent: Aug. 14, 1990

[54] VITAL PROCESSING SYSTEM INCLUDING A VITAL POWER CONTROLLER WITH FORGIVENESS FEATURE

[75] Inventors: David B. Rutherford; John W. Parker, both of Rochester, N.Y.

[73] Assignee: General Signal Corporation, N.Y.

[21] Appl. No.: 267,070

[22] Filed: Nov. 4, 1988

[51] Int. Cl.[5] .................. G06F 11/08; G06F 15/20
[52] U.S. Cl. .................................. 364/480; 364/200; 371/53
[58] Field of Search .............. 364/200, 900, 550, 480; 371/53, 37, 70, 25.1, 67, 16.1, 14; 340/664; 246/3, 5, 34 R, 34 B, 167 R

[56] References Cited

U.S. PATENT DOCUMENTS

| | | | |
|---|---|---|---|
| Re. 30,986 | 6/1982 | Sibley | 364/900 |
| 4,307,463 | 12/1981 | Sibley | 371/14 |
| 4,368,534 | 1/1983 | Sibley | 364/900 |
| 4,471,486 | 9/1984 | Sibley | 364/900 |
| 4,553,200 | 11/1985 | Sibley | 364/200 |
| 4,563,762 | 1/1986 | Sibley | 371/16.1 |
| 4,611,291 | 9/1986 | Hoelscher | 340/664 |
| 4,617,662 | 10/1986 | Auer, Jr. et al. | 371/25.1 |
| 4,740,972 | 4/1988 | Rutherford, Jr. | 371/53 |
| 4,831,521 | 5/1989 | Rutherford, Jr. | 364/200 |

Primary Examiner—Kevin J. Teska
Attorney, Agent, or Firm—John F. Ohlandt

[57] ABSTRACT

The present device, a vital power controller with forgiveness, is a subsystem of a larger vital processing system, the function of the subsystem being to verify the proper operation of the larger system and to provide power to the system outputs only when the larger system functions correctly; the larger system periodically delivers checkword sets to the vital power controller (VPC); the checkwords verify the correct operation of the larger system, a valid checkword set enabling the VPC to generate vital power for a limited time; the forgiveness feature allows the VPC to tolerate an occasional bad checkword set and yet continue to provide vital power if the rate at which bad checkword sets is encountered is below a specified rate, thereby providing improved performance in the presence of noise which tends to produce occasional bad checkwords and which would otherwise cause loss of vital power.

12 Claims, 12 Drawing Sheets

VITAL PROCESSING SYSTEM INCLUDING A VITAL POWER CONTROLLER WITH FORGIVENESS FEATURE

BACKGROUND OF THE INVENTION

The present invention relates to information processing systems, and particularly to an arrangement for verifying the vital (fail-safe) operation of a larger information processing system.

An appreciation of the larger system can be gained by reference to co-pending applications Ser. Nos. 267,218 and 267,214, assigned to the assignee of the present invention, the details of the disclosures of which are incorporated herein by reference. In particular, FIG. 10 of application Ser. No. 267,214 depicts the larger system in block form.

The invention is especially suitable for use in railway signalling and control systems which must be vital in their operation, that is, restricted to the safe or "off" state of each output which controls a signal, switch machine, or other signalling or control operation, unless the allowed or "on" condition thereof is enabled.

The present invention is an improvement in vital processing systems using a computer or central processing unit which, per se, is non-vital in its operation; for example, a microprocessor-controlled interlocking control system for the control of traffic control devices. Such a system is described in an article by David B. Rutherford, Jr., entitled "Fail-Safe Microprocessor Interlocking—An Application of Numerically Integrated Safety Assurance Logic", published in the proceedings of the Institution of Railway Signal Engineers (IRSE), Sept. 25-27, 1984. That system is described in greater detail in U.S. patent application Ser. No. 550,693 filed in the name of David B. Rutherford, Jr. on Nov. 10, 1983 and entitled "Vital processor" now U.S. Pat. No. 4,831,521. That system is also described in U.S. patent application Ser. No. 550,430 filed in the name of James R. Hoelscher on Nov. 10, 1983 and entitled "Vital Interface System for Railway Signalling", now U.S. Pat. No. 4,611,291 issued Sept. 9, 1986. Both of these applications are assigned to the same assignee as the present application.

Reference may also be made to U.S. Pat. No. 4,740,972 to David B. Rutherford, entitled "Vital Processing System Adapted for the Continuous Verification of Vital Outputs from a Railway Signalling and Control System", which is also assigned to the same assignee as the present application.

In U.S. Pat. No. 4,740,972, the function of a vital relay driver as part of a vital processing system is thoroughly disclosed and it will be understood that the device of the present invention, namely a vital power controller (VPC), is similar to the function of a vital relay driver—namely to receive and validate checkwords produced by another processor performing a vital system function. As long as the checkwords are correct and received within a designated time, the vital relay driver or vital power controller provides vital power to the system outputs. However, whenever an incorrect checkword is received, or no checkword has been received within a designated time, the vital power controller stops producing vital power, thereby disabling the system outputs.

All of the above-cited references contain disclosures which aid in understanding the concepts of the present invention, and they describe in great detail certain common components or features. Accordingly, the details of such disclosures are incorporated herein by reference.

Although a vital power controller or VPC perform the same function as a vital relay driver, it does so in a more cost-effective manner. In a VPC, the vital power is produced by a DC-to-DC converter which requires a vital high-frequency drive signal to produce the vital power output. This high-frequency signal is derived from circuitry which receives its power from the amplified and filtered VPC output signal.

A known arrangement of the sort just described is depicted in FIG. 1 of the drawing. Therein it will be seen that a DC-to-DC converter 16 and its associated drive circuitry functions as the vital power amplifier, which serves to amplify a low power DC voltage signal from passive analog circuitry 14, also appearing in FIG. 1.

A significant drawback is that in previous VPC designs there has been a loss of power whenever a bad checkword due to any source has been received, or when no checkword has been received within a designated time period. Accordingly, although these techniques of the prior art ensure safety, a system is created which is very susceptible to noise. If any noise enters the system at any point in the process by which the checkwords are created and communicated, there is the possibility that the noise will interfere with normal checkword production; hence, the VPC will cease producing vital power and, therefore, may result in a complete system reset.

Accordingly, the primary object of the present invention is to overcome the above-noted significant drawback of previous vital power controller constructions and to ensure that a measure of forgiveness is introduced into the VPC in the event the noise generated in the system produces spurious or faulty checkwords.

Thus, it is provided that as long as valid checkwords are regularly received and occasional bad checkwords or missing checkwords are encountered only at or below a selected rate, vital power will continue to be furnished. However, if there are indeed hardware failures, these will be rapidly detected by the VPC because such failures will result in the creation of repeated bad checkwords at a rate much higher than that tolerated by the VPC.

SUMMARY OF THE INVENTION

The primary feature of the present invention is based on the recognition that discrimination can be introduced into a vital power controller device or subsystem such that the VPC will have a measure of forgiveness and be more tolerant in the sense of not shutting the system down when bad checkwords, generated as the result of noise in the environment, occur. Precisely because such noise events occur at a relatively low rate when compared with the rate encountered with hardware failures, such discrimination by the VPC of the present invention can be readily tailored to a particular environment.

The above-noted discriminating ability of the device of the present invention can be appreciated by referring again to FIG. 1 of the drawing in which a known scheme or arrangement, involving a VPC 10, is shown. In that figure, the specialized microprocessor 12 receives checkword sets from the larger system involved; in particular, from another microprocessor which generates such checkword sets, which are odd and even in character.

In accordance with the primary feature of the present invention however, the microprocessor of the VPC is reorganized and reprogrammed to produce the desired discrimination already discussed; that is to say, a desired forgiveness feature is introduced as will be explained. The microprocessor converts checkword sets received from another microprocessor in the following manner. It contains two short routines—one sets the vital output bit from which the vital drive signal is taken, and the second routine clears it. To generate a vital output signal with a designated wave form, the program for the microprocessor must execute these two routines at the proper times and in the proper sequence. For example, to generate a fixed-frequency square wave, the routines must be called alternately. This can be done by alternately calculating the address of one routIne and then the other, and jumping between them. The address calculation uses a feedback shift register (FSR) and a table in a ROM device. The ROM table has been created assuming that the FSR is initialized to a specific starting value. Each time the FSR is shifted a designated number of times, its new state is exclusive-ORed with the next table entry, and the result is the address of the next routine to clear or set the vital drive hit. Checkword sets are used to initialize the FSR. Therefore, a valid checkword set allows the vital power controller (VPC) to generate vital power for a time limited by the number of entries in a ROM table. Once all table entries are used, the correct addresses can no longer be generated in the desired sequence until the FSR is reset with the correct initial value for the table. Different ROM tables are used for odd and even checkword sets.

The unique forgiveness feature incorporated in the microprocessor of the vital power controller is implemented by a set of buffers, called cycle of forgiveness (COF), or forgiveness, buffers, each of which can be used to initialize the feedback shift register (FSR) for generating a period of vital drive signal equivalent to that for a valid checkword set. In other words, these buffers serve to simulate for a given period the existence of a valid checkword set.

A unique ROM table is used to operate the VPC during the cycle of forgiveness so that the cycles cannot be confused with a normal odd or even checkword cycle. When any COF buffer is used, its contents are destroyed in the process. To reuse the COF buffer, it must undergo a process called "maturing". In accordance with this process, the buffer is first initialized with a value taken from a table of COF initialization values. The COF buffer is configured as a polynomial divider. Each time a valid odd or even checkword set is processed, the final state of the FSR is fed into the divider. This changes the buffer state in a known manner. After a fixed number of valid checkword cycles, the COF buffer will contain the value which can be used to provide a cycle of forgiveness.

Accordingly, it will be understood that, briefly stated, the present invention is defined as a vital power controller comprising (1) a microprocessor adapted to receive odd and even checkword sets, and including means for converting the checkword sets so as to produce a vital drive signal, such as a square wave of fixed frequency, at its output; (2) a passive detector for receiving said vital drive signal at its input and providing a low power DC voltage at its output; (3) a DC-to-DC converter for receiving said low power DC voltage at its input and providing a vital output signal, or vital power, at its output; said means for converting said checkword sets including a feedback shift register, a read-only memory (ROM) having odd and even tables stored therein whereby a valid checkword set enables the vital power controller to generate said vital power for a time limited by the number of entries in the ROM tables.

Further included in the vital power controller are means for discriminating between noise events occurring at a relatively low rate compared with the rate encountered with hardware failures, said means for discriminating including a plurality of forgiveness buffers, each of which is operative to initialize the feedback shift register for generating said vital drive signal for a period equivalent to that for a valid checkword set; further comprising, in the microprocessor, a read-only memory portion containing a unique ROM table, i.e., a cycle of forgiveness table, for operating the vital power controller during cycles of forgiveness such that these cycles cannot be confused with the normal odd or even checkword cycles.

Other and further objects, advantages and features of the present invention will be understood by reference to the following specification in conjunction with the annexed drawing, wherein like parts have been given like numbers.

DESCRIPTION OF PREFERRED EMBODIMENT

Simplified View of the VPC and Its Operation

Figure 1:
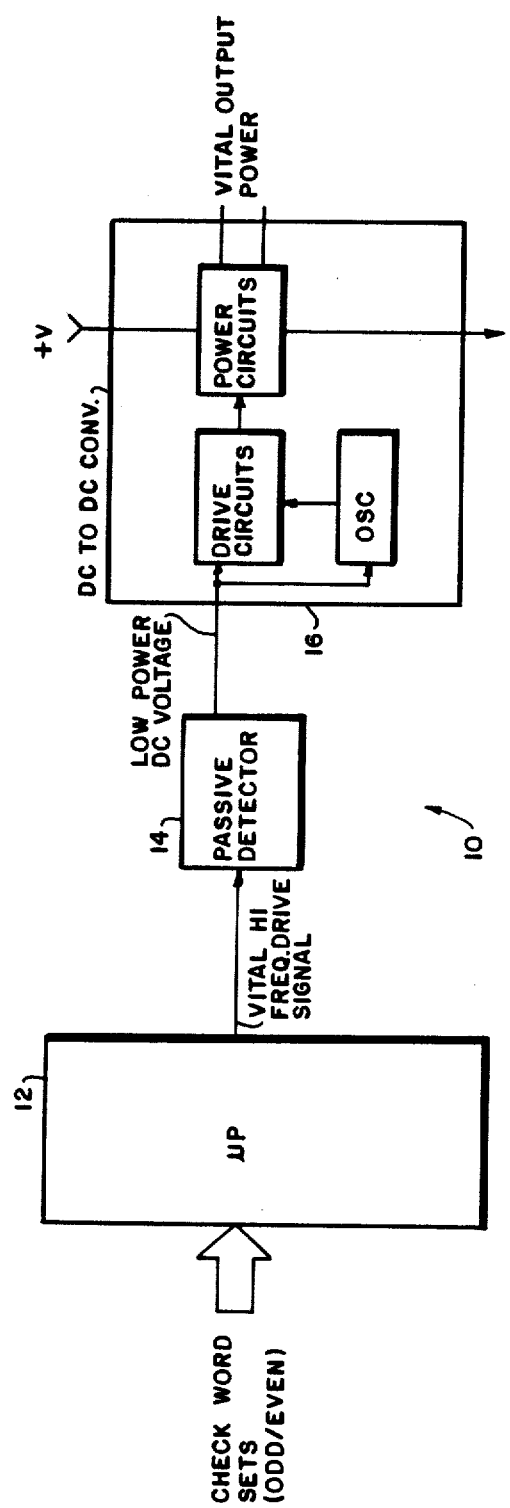
FIG. 1 is a block diagram which illustrates the known vital power controller (VPC).

As will be understood from the block diagram of FIG. 1 in which a known VPC 10 is illustrated, the VPC receives checkword sets at a designated rate. A checkword set authorizes the VPC to provide vital power for a designated time period. Checkword sets are of two types—odd or even. During normal operation, odd sets alternate with even.

Figure 2:
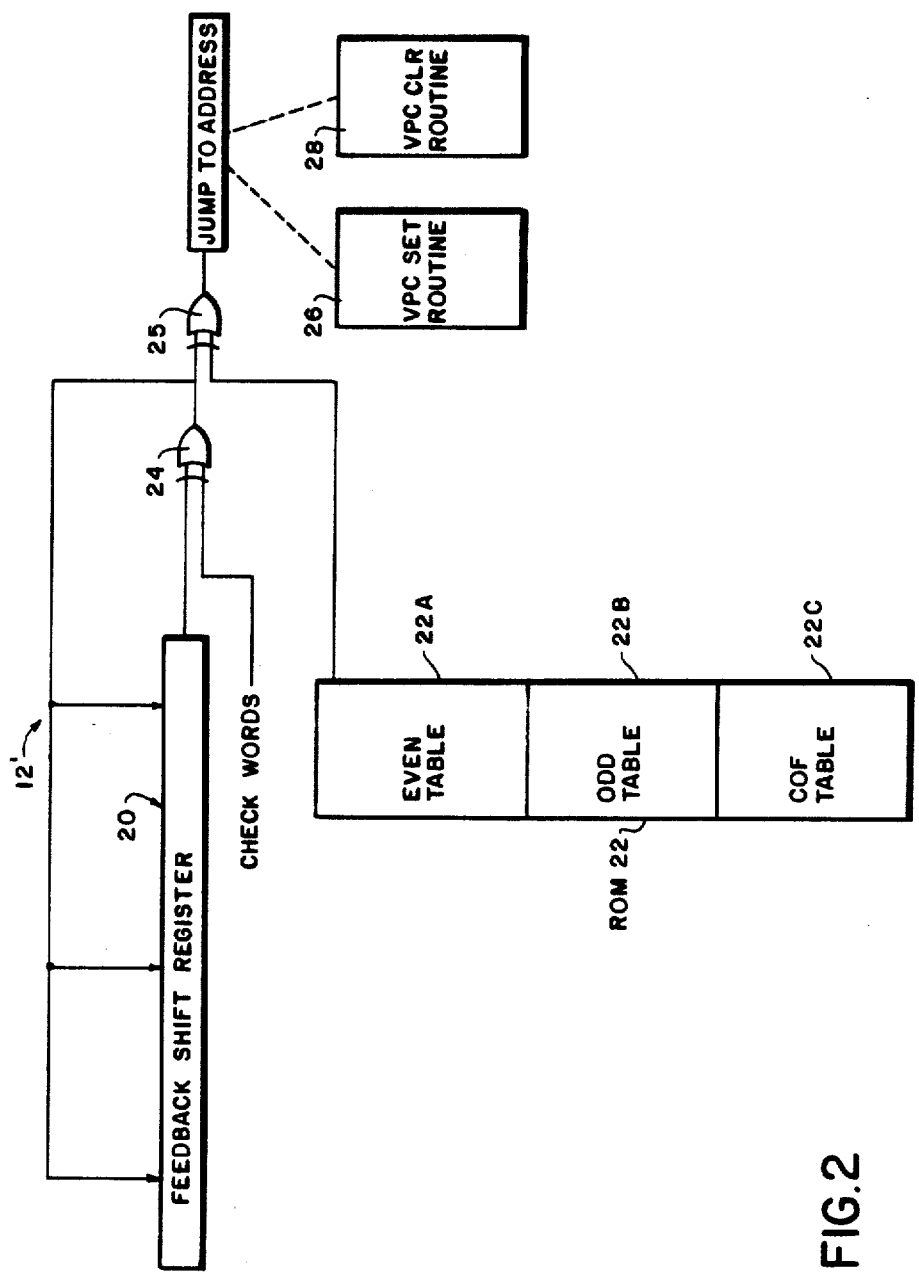
FIG. 2 is a functional block diagram depicting certain of the components of the microprocessor portion of a vital power controller in accordance with the present invention; and particularly illustrating the feedback shift register and the read-only memory forming part of said microprocessor.

Referring now to FIG. 2 of the drawing, there will be seen, in functional block form, the unique VPC of the present invention, comprising a revamped microprocessor 12' in place of the microprocessor 12 of FIG. 1. A significant component of microprocessor 12' is a feedback shift register 20. As checkwords are received, they are fed into this feedback shift register. The state of the shift register 20 following this process depends upon the initial state of the shift register and the checkwords fed in by way of exclusive OR gate 24. When both are correct, the final state will be the desired state. If one or both are incorrect, it is highly improbable that the resulting value will be correct. The probability of this event is $1/N^{**}2$ where N is the number of bits in the feedback shift register, and it can be made smaller by increasing N. Since there are only two checkword sets (odd or even), there are only two valid values which can be produced in this manner in the VPC shift register 20. With one of these values in the VPC shift register 20 or with a third value, created by the use of a cycle-of-forgiveness, the VPC can for a limited time create the vital drive signal required to generate vital power.

The ROM 22 seen in FIG. 2 is another significant component of the VPC cf the present invention. It contains tables generated by an application program. There is a table 22A for an even cycle, a table 22B for an odd cycle, and a table 22C for a cycle of forgiveness (COF). Each table was generated assuming that a specific initial value existed in the VPC feedback shift register 20. Each table is actually an array of sixteen bit offset values. When the shift register 20 contains the correct initial value, and a table pointer 23 is initialized to the beginning of the corresponding table, an address can be generated by shifting the shift register (with feedback taps connected in a prescribed manner) a designated number of times and exclusive-ORing, by means of gate 25, the sixteen most significant bits from the shift register with the next offset value from the table. During this process the checkwords input is held to zero. The tables 22A and 22B are calculated such that when this process is repeatedly performed, two alternating addresses are produced.

Figure 3:
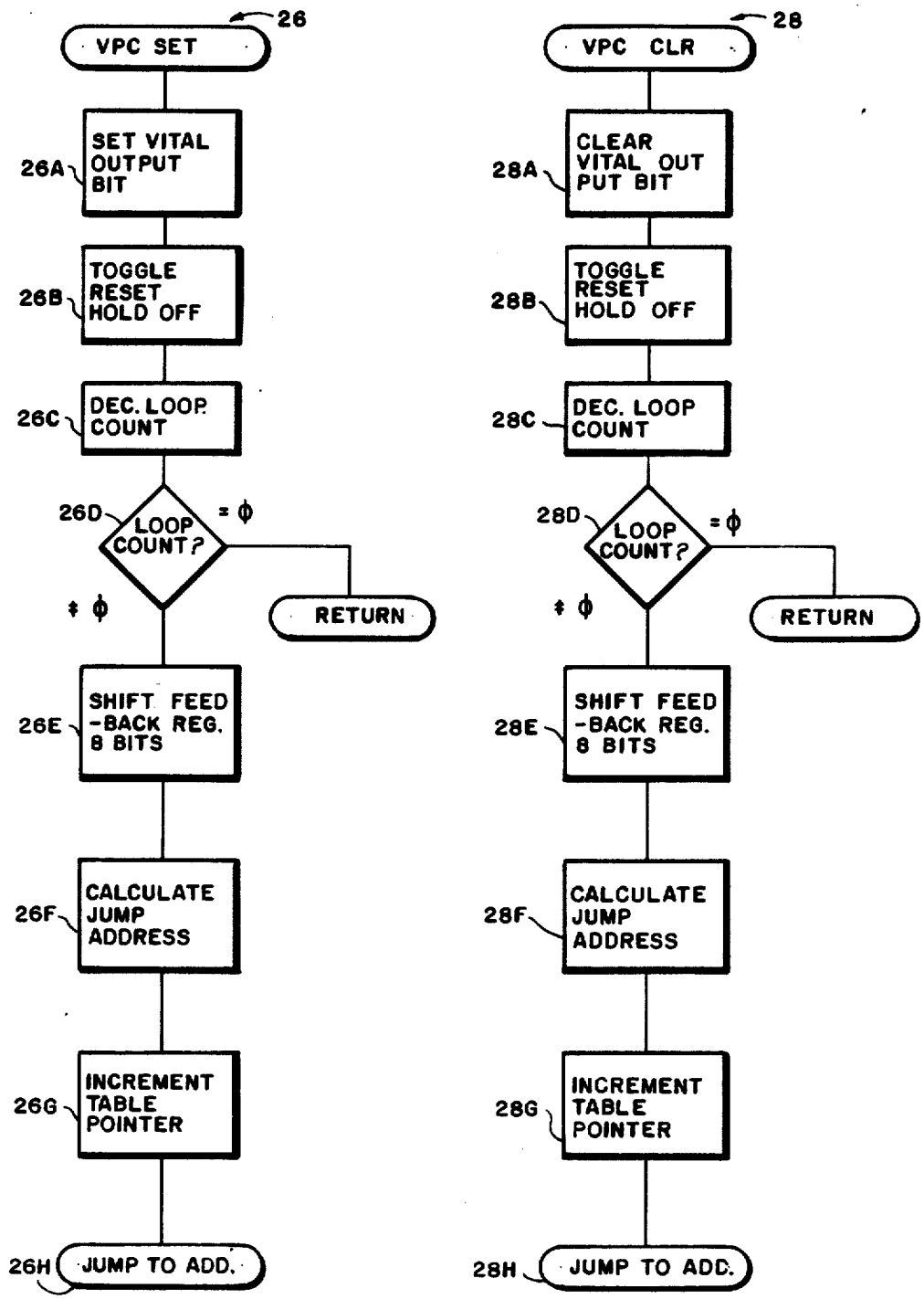
FIG. 3 is a flow chart or diagram of the steps or operations involved in accordance with the execution of a VPC set routine and a VPC clear routine.

Referring now to FIG. 3, flow charts depicting the production of the alternating addresses are seen. One address is that of a short routine 26 which sets the vital drive bit and then performs the shift and exclusive-OR address calculation just described. The routine then branches to the calculated address (26H). The other address is that of a similar routine 28 which clears the vital drive bit, performs the shift and an exclusive-OR operation and then branches to the calculated address (28H). The tables 22A and 228 are designed such that each routlne calculates the address of, and branches to, the other. Therefore, when the shift register contains a valid initial value and the table pointer points to the top of the corresponding table, a call to one of the routines will result in alternating execution of the two routlnes. The routines include steps 26A-26H and 28A-28H respectively, and involve decrementing a counter (steps 26C and 28C) which is initialized to the number of table entries. When the counter is decremented to zero, the process stops when the final table value is used. It cannot proceed because there is no table value to convert the final state to the next address.

As the two routines 26 and 28 toggle between one another, they alternately set and clear the vital-drive bit, thereby generating a square wave (vital drive signal) at a frequency determined by the number of instructions in the routine and the rate at which instructions are executed as determined by the processor clock 40, (FIG. 4). This signal is then filtered by a tuned circuit in the passive detector 14, which rejects signals at frequencies significantly different than that expected. The filtered signal is rectified and used to generate power for the drive circuitry and oscillator for the DC-to-DC converter 16 which generates the vital power for the system.

When the VPC performs as just described, the final state of the shift register 20 is indicative of the nature of the checkword set just received or of the fact that a cycle of forgiveness, in accordance with the invention, was used. Maturing is the process by which a COF buffer, such as COF buffer 1 seen in FIG. 5, (after being used to provide a cycle of forgiveness) is returned to the condition in which it can be reused to provide a cycle of forgiveness. As will be described, the maturing process for COF buffers will further change the final value for odd and even cycles, but the maturing process is designed such that it always produces unique final values in the VPC shift register for odd and even cycles. Maturing is not done following a cycle of forgiveness. When odd and even checkword sets alternate, the final odd value becomes the initial value for an even cycle and the final even value is the initial value for an odd cycle. If even checkwords follow an even cycle, or odd checkwords follow an odd cycle, or if no checkwords are received when required, the process must terminate or a cycle of forgiveness must be used. Offset constants are provided in ROM such that the final value resulting from a cycle of forgiveness can be used with either odd or even checkword sets.

Figure 5:
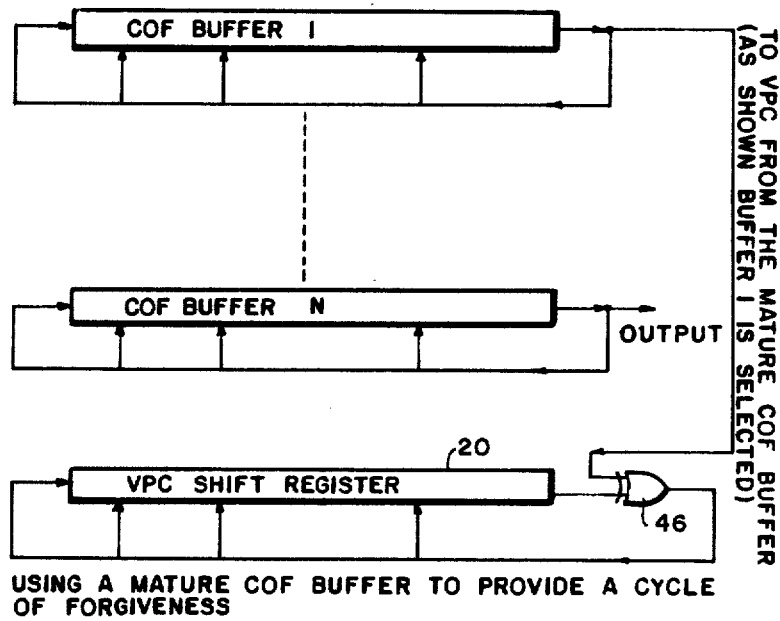
FIG. 5 is a functional block diagram depicting the forgiveness feature or means for discriminating between noise events and hardware failures; including forgiveness buffers that are used in the system in connection with the feedback shift register, and particularly illustrating the transmission of data from such forgiveness buffers to the feedback shift register.
Figure 6:
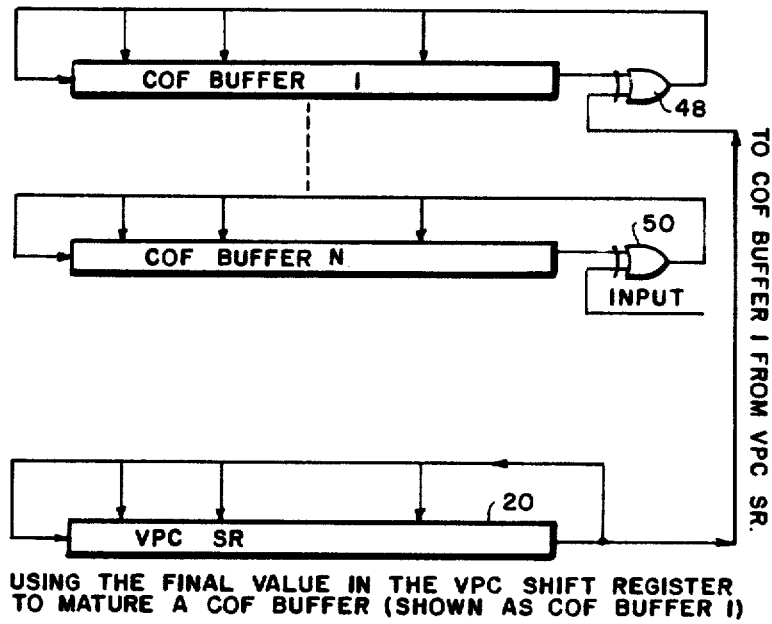
FIG. 6 is a functional block diagram similar to FIG. 5, but particularly illustrating the transmission of data from the feedback shift register to the forgiveness buffers.

Cycles of forgiveness are provided by COF buffers, 1-N, seen in FIGS. 5 and 6, which are linked to feedback shift register 20 by exclusive OR gates 46, 48, 50. Each COF buffer contains a number which can be converted into the correct initial VPC shift register state required for a cycle of forgiveness. During the conversion process both the given COF buffer and the VPC feedback shift register 20 are treated as feedback shift registers, and the contents of the COF buffer is shifted into the VPC shift register 20. This process destroys the COF buffer contents insuring that a COF buffer must undergo maturing before it can be used again. Once initialized, a COF proceeds exactly as a normal odd or even cycle with the exception that the COF table 22C of ROM 22 is used rather than the odd or even table.

The maturing process for a COF buffer assures that a minimum number of valid odd or even cycles must occur between the time a COF buffer is used to provide a cycle of forgiveness and the time it can be reused. After a COF buffer is used, it is initialized to a value selected from ROM. As described previously, each time a valid odd or even cycle occurs, the final value in the VPC shift register 20 is proof of this event. To mature a COF buffer, the VPC shift register 20 and buffers 1-N are configured as polynomial dividers with the output from the VPC shift register 20 fed into the input of the COF buffer 1-N (FIG. 6). The shift register contents are then shifted into the given COF buffer, and then an offset constant from ROM is exclusive-ORed into the COF buffer. There are actually two offsets—one for an odd and one for an even cycle. The offset constants are selected such that the process produces the same resulting value in the given COF buffer regardless of whether an odd or an even cycle occurs. The overall effect is that each time a valid odd or even cycle occurs, the COF buffer changes its state in a predictable manner. After the desired number of valid odd or even cycles, the COF buffer will contain a known final state. This is the mature COF state which can be used to provide a cycle of forgiveness.

DETAILED DESCRIPTION OF VPC HARDWARE

It will be understood that the VPC of the present invention is designed to be a portion of an overall system. The exact nature of that system can vary from application to application. The VPC must receive valid checkwords from the other system components at a designated rate in order to continue to provide vital power at the VPC output, as seen in FIG. 1, for use by the remainder of the system.

Figure 4A:
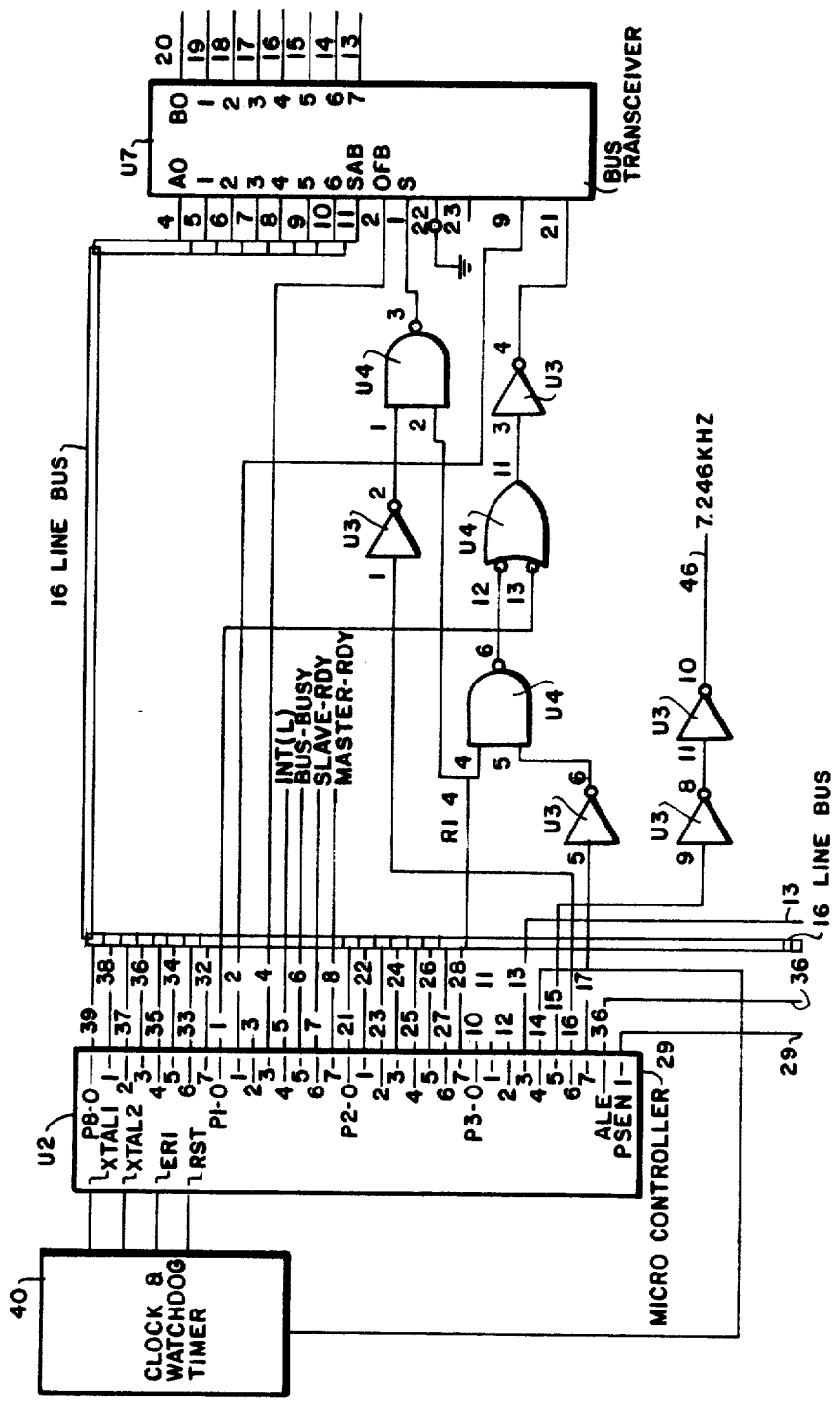
FIG. 4, comprised of FIGS. 4A-4C, is a schematic diagram showing in some detail the implementation of the vital power controller of the present invention.
Figure 4B:
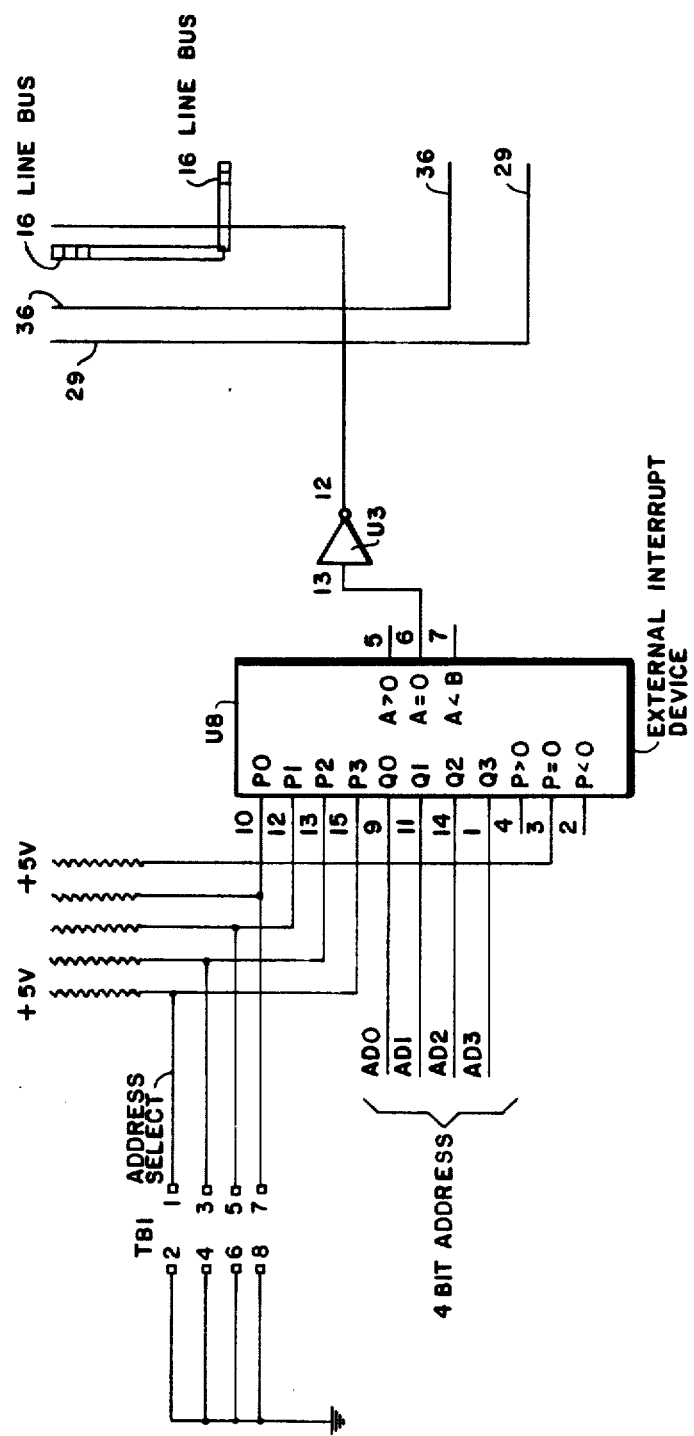

FIG. 4 is a schematic diagram of the digital portion of the VPC circuit. The essential part of this digital portion is an 8031 microcontroller, designated U2, to which a clock and control signals component 40 is connected (FIG. 4A). Checkwords are passed to the microcontroller via the bus transceiver U7 and the associated gating logic U3 and U4. Whenever a system component has checkwords to transmit to the VPC, it places the VPC address on the lines AD0 to AD3 (FIG. 4B), which are connected to external interrupt device U8. This address is detected by U8 and causes an interrupt of the microcontroller U2. The microcontroller monitors the BUS-BUSY line, and when it finds the bus not busy, it places a byte onto the bus, which acknowledges that it is ready to receive checkwords. It then waits for the MASTER-RDY line to go low indicating that a byte is on the bus. It reads the byte and pulls its SLAVE-RDY line low to acknowledge the receipt of the byte. When it sees MASTER-RDY go high, it pulls SLAVE-RDY high to signal the completion of the transfer of the first byte. The process is then repeated for all subsequent bytes of the checkword set.

Figure 4C:
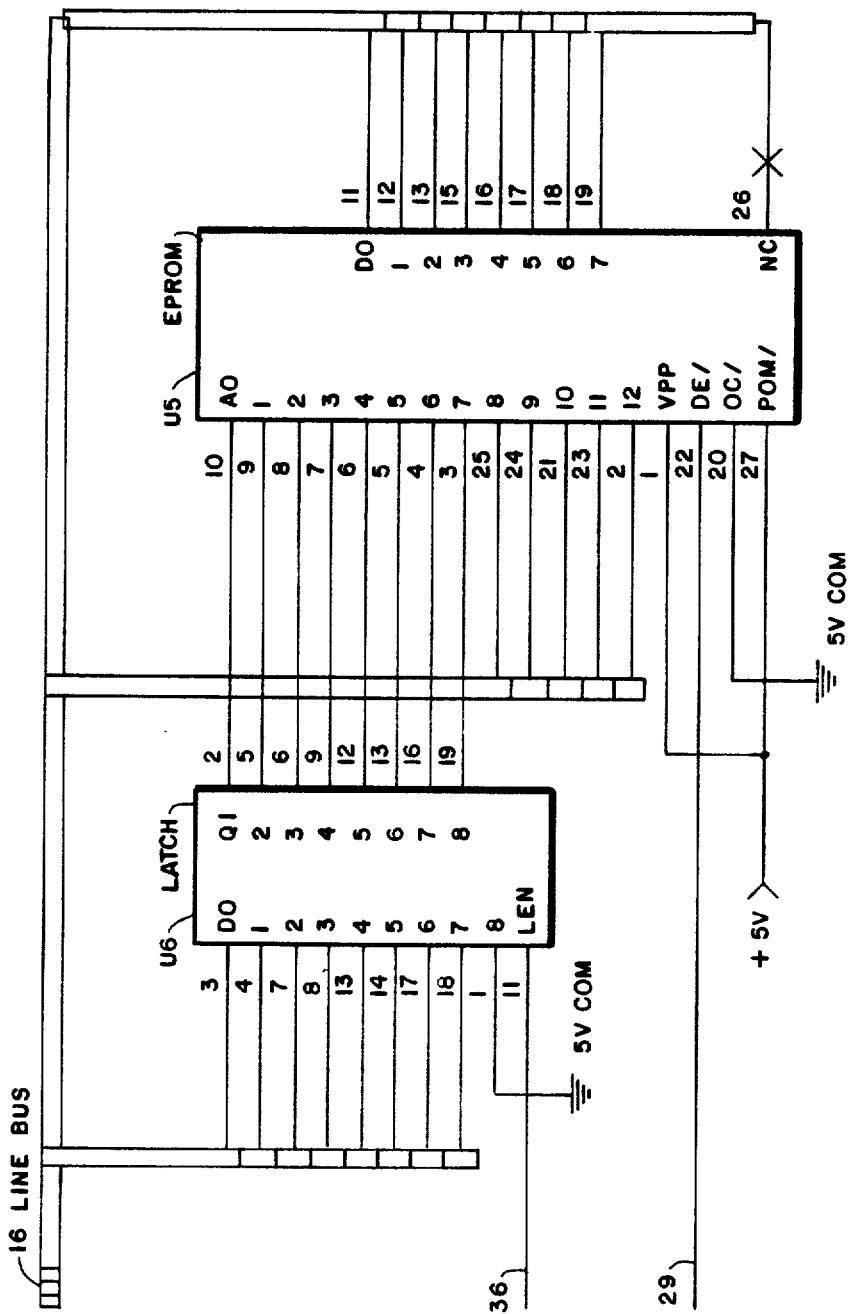

Referring to FIG. 4C, U5 is the EPROM memory in which the VPC program, as well as the ROM tables 22A, 22B, and 22C, are stored. U6 is a latch required to hold the lower 8 bits of the instruction address being fetched from the memory. When the VPC detects valid checkwords, it provides, at connection 46 (FIG. 4A), a vital 7.246 kHz signal required to generate vital power.

The vital 7.246 kHz drive signal is transmitted to the conventional passive detector 14 forming part of the VPC. This detector 14 forms part of the analog portion of the VPC circuit, contrasted with the digital portion 12. Also part of the analog portion of the VPC is the conventional DC-to-DC converter 16 (FIG. 1), at whose output the required vital power signal is produced from a low-power DC voltage level at its input.

DESCRIPTION OF VPC SOFTWARE

As previously noted in the Simplified View of the VPC and its operation, FIG. 2 is a block diagram of the basic elements of microprocessor 12', used in connection with the system software to generate the 7.246 KHz vital-drive signal at the connection 46 (FIG. 4A) for transmission to the detector 14. It will be appreciated that various operations are performed on feedback shift register 20. Each operation involves a different arrangement of the feedback employed with the register. Also, at times data is fed into the register and other times data is shifted out of the register. At other times values are exclusive-ORed into all bits in the register simultaneously, as previously described. Actually, the shift register 20 consists of several consecutive memory locations in the memory of microcontroller U2, and all of these operations are performed by calling different software routines.

Since each bit in the shift register can be either a one or a zero, there are $2^{}N$ possible states which the register can take. If the taps on the register into which bits are fed in the exclusive-OR operation are selected to match the one bits in a primitive polynomial, the device has a very useful property. When the device is put in any non-zero initial state, it must be shifted $2^{}N-1$ times before it will return to its initial state. If $N=32$ and 16 shifts occur every 7.246 KHz cycle, the device cannot return to its initial state for 10.3 hours.

Assume that the shift register 20 is placed into a known non-zero initial state. Since the initial state is known, the nature of bit stream produced as the device is shifted is also known. The bit stream is exclusive-ORed, as will be understood, with bits from a table to produce any desired output stream. The table values have been selected and stored in system ROM based upon the known initial state of the shift register and the desired output sequence. On the other hand, if the shift register 20, is not initialized to the desired state when the process is begun, the bit sequence produced by the shift register will not match the table values and the result of the exclusive-OR with the table values will be a random sequence of ones and zeroes rather than the desired output sequence. Also, if the feedback shift register is initialized correctly but the pointer into the table does not point to the corresponding table entry, the result of the exclusive-OR operation will be a random sequence. In summary, in order for the desired output sequence to be produced from the exclusive-OR gate, both the initial state of the shift register and the pointer into the table must be correct.

As indicated in FIG. 2, the program to produce the VPC vital-drive signal consists of two short routines 26 and 28—one called VPCSET (26) and the other called VPCCLR (28). Assume that VPCSET is called and that the system has been initialized to generate the vital drive signal following the receipt of an even checkword. The table pointer is set to the top of the table marked EVEN TABLE and the shift register is initialized to the value corresponding to the initial entry in the EVEN TABLE. Also assume that a loop counter has been initialized to the number of valid table entries in the EVEN TABLE.

The flowcharts for VPCSET and VPCCLR are shown in FIG. 3. VPCSET first sets the vital-drive bit and toggles the reset hold off bit to avoid a hardware reset. The loop count is decremented and tested to see if all the entries have been used. If so, a return is made from VPCSET. If not, the shift register is shifted eight bits, and the sixteen most significant bits of the shift register are exclusive-ORed with the next sixteen bits from the table. The resulting sixteen bits form an address in the 64K address space of the microcontroller. The table pointer is incremented to the next table entry, and then a jump is made to that address. The EVEN table has been designed such that the address calculation done in VPCSET results in the address of VPCCLR when the shift register and table pointer are properly initialized. VPCCLR performs the same operations as VPCSET except that it clears the vital-drive bit. The result of its address calculation is the starting address of VPCSET. Therefore, when the system is properly initialized, VPCSET and VPCCLR alternately jump from one to the other setting and clearing the VPC vital-drive bit and generating a 7.246 KHz square wave at this output pin of the microcontroller the operation must cease when all the table entries are used up since any subsequent calculations will not produce correct jump addresses.

When the shift register 20 starts in a specified initial state and is shifted through a designated number of cycles corresponding to the designated number of table entries, it finishes containing a specific final state. Therefore the final state in the shift register is indicative of the process just completed. The actual final state is further modified during the process of maturing cycle-of-forgiveness (COF) buffers. However, since the maturing process involves shifting the shift register a fixed number of times, as will be described below, the final state after COF buffer maturing is still indicative of the nature of the cycle just completed; i.e., odd, even, or cycle of forgiveness.

In FIG. 2, there are three tables shown-EVEN (22A), ODD (22B) and COF (22C). The system is designed to process alternative groups of checkwords designated even and odd. If even checkwords are received, they are used to initialize the shift register 20 to the proper initial state for an even cycle, and the table pointer is set to the beginning of the EVEN table. Likewise, if odd checkwords are received, they are used to initialize the shift register to its odd initial state, and the table pointer is set to the beginning of the ODD table.

If a bad checkword is received, or if no checkword is received within a designated time after completion of the previous cycle, the system attempts to use a cycle of forgiveness (COF). The VPC software has been designed to use from zero to eight COF buffers depending upon the number of cycles of forgiveness required. As explained below, after the system receives a designated number of valid checkwords (either even or odd), a COF buffer becomes mature; that is, it contains a value which can be used to substitute for a valid even or odd checkword. Assuming that at least one mature COF buffer is available, the VPC can use this buffer to set the shift register to the initial value needed to run one cycle of forgiveness, and it sets the table pointer to the beginning entry in the COF table. The result is the same in either case (even checkword, odd checkword, or cycle of forgiveness). The VPC will produce for a designated time the 7.246 KHz vital-drive signal.

The number of COF buffers and the number of valid odd or even cycles required to mature a COF buffer are parameters which are specified when the VPC tables are generated. These parameters determine the noise immunity of the VPC. The tables are generated by an application program, combined with the VPC software and then burned into the VPC ROM. To change the VPC performance, a new ROM must be generated.

During normal operation, the VPC alternately receives even and odd checkwords. Assume that the VPC is running normally and that the last checkword set received was odd. After all the values of the ODD table are used up, the VPC stops generating the vital-drive signal and enters the routine which matures COF buffers. It then awaits the next checkword set. As indicated above, the final value in the shift register verifies that the previous cycle as an odd cycle. As each byte of the new checkword set is received, it is fed into the shift register in the manner shown in FIG. 2. Each bit of the checkword is exclusive-ORed with a bit shifted out of the shift register. If the resulting bit is a zero, no further action is taken. If the resulting bit is a one, selected bits in the shift register are exclusive-ORed with a one.

The feedback taps seen in FIGS. 5 and 6 are selected to correspond with the one bits in a primitive polynomial, and the resulting operation has the properties described above. This circuit is commonly called a polynomial divider because it performs a division of the bit stream being fed into it by the polynomial which determines the feedback taps. The contents of this shift register can be considered the remainder of this division.

After all checkword bytes are fed into the divider, the final result is a unique value which depends upon the initial state in the divider at the beginning of the operation and the checkwords received. Therefore for an odd cycle followed by an even checkword, this result will contain a unique value which can only be calculated when an odd cycle is followed by an even checkword. An offset constant is then exclusive-ORed in parallel (gate 24) into the shift register 20 to convert this unique value into the unique starting value for an even cycle. This constant has been precalculated and stored in ROM for use in this case.

Similarly, if an odd checkword is received following an even cycle, the shift register 20 contains the unique value generated as the result of the successful completion of an even cycle. When the odd checkword is fed into this value by the process just described, another unique value is generated which confirms that a valid odd checkword has followed a valid even cycle. This value is converted to the required initial value for an odd cycle by exclusive-ORing into the shift register a precalculated offset constant stored in ROM.

Therefore, when valid even and odd checkwords alternate, the valid final value for one cycle is converted to the valid initial value of the next cycle through the checkwords received and the offset constants available in ROM. Since there are no offset constants for even cycles followed by even checkwords or odd cycles followed by odd checkwords, the even and odd checkwords must alternate to avoid using a cycle of forgiveness.

As checkwords are received, they are non-vitally validated to determine if they are correct and in the expected sequence (alternate odd and even). Checkwords can be non-vitally checked because they are arbitrarily chosen to be code words in a set generated by a polynomial. The words are checked as they are received by dividing them by the polynomial. If the result is zero, they are assumed to be correct, otherwise they are rejected. If the code words are rejected, or not received at all within a specified time limit (on the order of a few milliseconds), a cycle of forgiveness buffer must be used.

Assume that the VpC is set up to have at least one cycle of forgiveness, and therefore at least one COF buffer. For each COF buffer there is an associated flag. If that flag is set, the buffer is mature, and its value can be used to provide one cycle of forgiveness. FIG. 5 shows the way a COF buffer is used. First, the shift register 20 is cleared to remove all trace of the previous cycle. Then in the same manner in which checkwords are fed into the shift register, the contents of the COF are fed into the register (FIG. 5). However, as indicated, the bytes are not simply taken one after the other from the COF buffer, but the COF buffer itself is treated as a polynomial divider. The bytes are fed out of the COF buffer as the result of a polynomial division. When the COF buffer is in the correct initial state, the stream of bytes produced by this operation is unique. When these bytes are fed into the VPC shift register 20 as indicated, the result is a unique state in that shift register. In addition, this process destroys the contents of the COF buffer in the process of using it to generate a cycle of forgiveness. Therefore, whenever a COF buffer is used to generate a cycle of forgiveness, it must go through the maturing process again before it can be reused. Associated with each COF buffer is a corresponding COF offset constant stored in ROM. When this value is exclusive-ORed into the VPC shift register following the operation just described, the result is the desired initial value for a COF cycle. The pointer is then initialized to the COF table and the VPCSET is called. Also, whenever a COF buffer is used, the corresponding buffer flag and counter are cleared to indicate that the buffer requires reinitialization and maturing.

Following a COF cycle, one of two events can occur. First, invalid checkwords or the absence of any checkwords can occur. In that event, an attempt is made to use another cycle of forgiveness. If a mature buffer is found, the cycle of forgiveness must be used to continue operating. If none is found, the process must halt. Secondly, a valid checkword (either odd or even) can be received. The contents of the VPC shift register contains the final value for a previous COF cycle. When the new checkwords are shifted into the shift register, the result will not be the same as that obtained after a valid odd or even cycle. To convert this result into the valid initial state for the coming odd or even cycle, there are two offset constants stored in ROM—one for use with an even checkword following a COF cycle and one for use with an odd checkword following a COF cycle. These offsets convert the shift register state into the desired odd or even initial state. Therefore, a COF cycle can be followed by either an odd or an even checkword.

Following reset, the VPC shift register will not contain a valid final state and no COF buffers will be matured. Therefore, it is necessary to initialize the VPC shift register to a starting value by another means. It is also necessary to have vital startup delay on reset to avoid a condition where the system runs for a time, fails, and the immediately resets and runs for a time, and fails again. Such an operation could go undetected, unless the VPC forced a period following reset during which no vital output signal can be generated, thereby causing a loss of vital power for a designated time. To do this, the VPC shift register is loaded with an initial value, and a count value is loaded. The VPC enters a delay loop in which the VPC shift register is used as a polynomial divider as shown in FIG. 6 with the exception that no data is fed out to the COF buffers. The loop shifts the polynomial divider eight times and then decrements the loop count. When the loop count reaches zero, the final result is a function of the initial condition and the number of runs through the loop. The time delay can be calculated from the time interval consumed in one pass through the loop and the number of passes. This final value can then be converted into the final COF value by exclusive-ORing in an offset constant stored in ROM. At this point, the delay has produced the same state in the shift register as that resulting from the use of a cycle of forgiveness, and upon receiving the next valid odd or even checkword, the VPC can begin producing the vital-drive signal.

The final topic to be treated is the maturing of the values in the COF buffers. The process is similar to that described for the use of a COF buffer in initializing the VPC shift register 20 for a cycle of forgiveness. The difference is that bytes are shifted from the VPC shift register into the COF buffer instead of the other way around (FIG. 6). First assume that a valid even or odd cycle has just been completed. The VPC shift register contains the final value associated with that even or odd cycle. Associated with each COF buffer is a counter and a flag. When the flag is set, the buffer is mature and needs no further processing. Then the flag is not set and the count is zero, the COF buffer has just been used and must be reinitialized to begin the maturing process. Associated with each buffer is an initialization constant stored in ROM which is loaded into the buffer under this condition. As shown in FIG. 6, the buffers are matured by shifting the contents of the VPC shift register into each buffer which has its flag cleared. This modifies the state of both the VPC shift register and the COF buffer. If the buffer flag is already set, the VPC shift register is shifted the required number of times, but the output is merely discarded and corresponding COF buffer is not modified since it is already mature. Therefore, regardless of which buffers are mature and which are not, the VPC shift register is always in a known state when it begins shifting bytes into any buffer which is not mature. Also, when the process is completed, the VPC shift register is in the same final state regardless of how may COF buffers required maturing.

This process is done following either a valid odd or even cycle. However, the data differs between odd or even cycles because the value in the VPC shift register is different for odd and even cycles. To eliminate this variation, each buffer has associated with it an odd offset constant and an even offset constant which are exclusively-ORed into the buffer immediately following the shifting operation. The odd constant is used following an odd cycle and the even constant following an even cycle. The purpose of the constants is to make the results from an odd or an even cycle the same. This operation eliminates the complications which would otherwise arise because odd and even cycles may not always alternate when cycles of forgiveness are used. It also simplifies the process in that maturing can begin on either an odd or an even cycle without concern.

As just described, following each odd or even cycle, data is shifted from the VPC shift register into each COF buffer which is not matured. Each time this happens, the buffer count is incremented and tested. When the count is found to be that required for a mature buffer, the buffer flag is set and the process is stopped.

The forgiveness of the system can then be described in terms of the number of COF buffers used and the number of cycles required for a buffer to mature. For example, if one COF buffer were used and one hundred valid odd and even cycles were required for the buffer to mature, the VPC would tolerate one bad checkword set in every 101 sets. If bad sets occur more rapidly, the COF buffer will not mature fast enough to accommodate them.

FLOWCHART OF THE VPC SOFTWARE

Figure 7A:
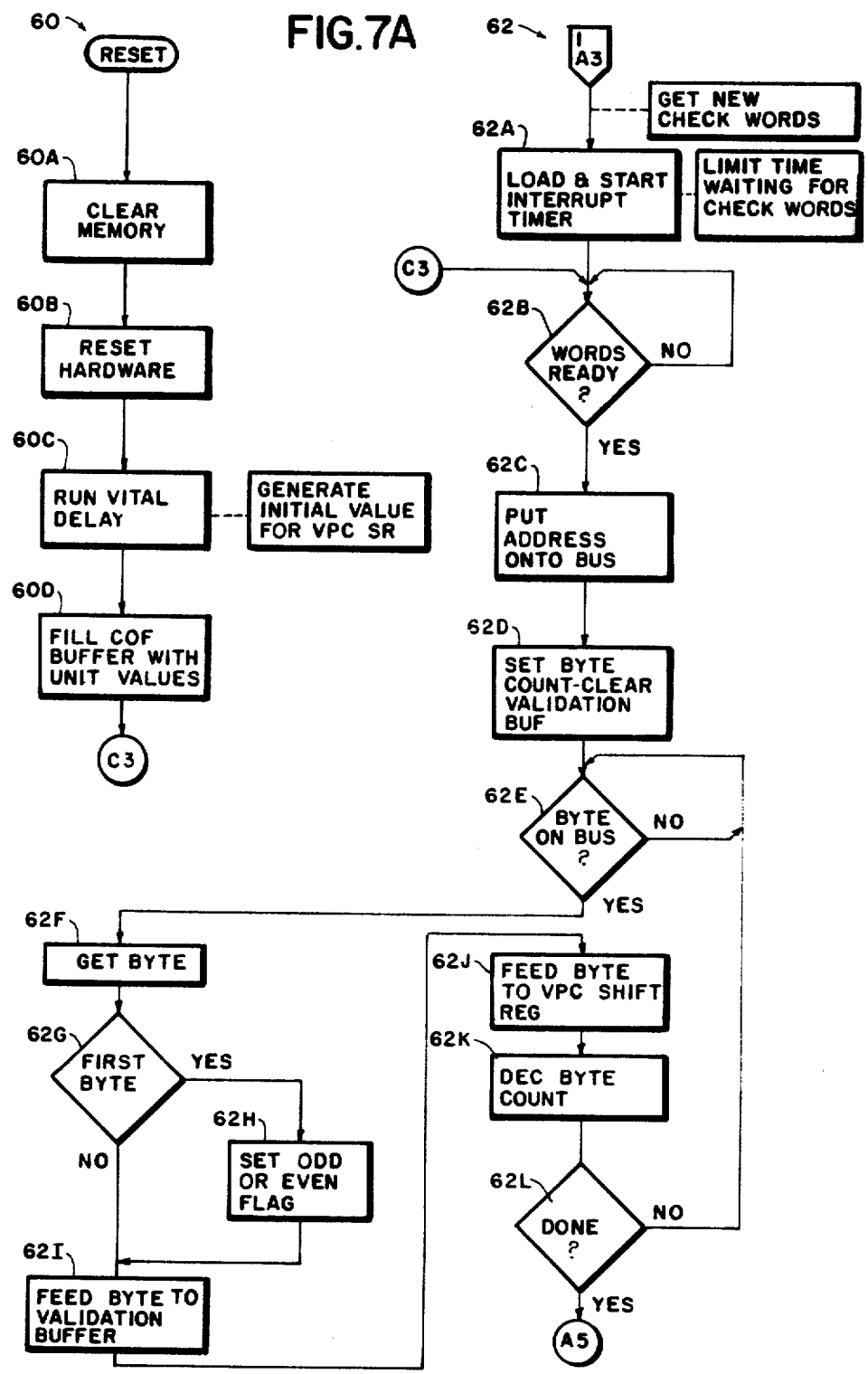
FIGS. 7, comprised of FIGS. 7A-7C, and 8 comprised of FIGS. 8A-8B, are flow charts representing both the steps of the program involved in the present invention and the hardware means that execute such program.
Figure 7B:
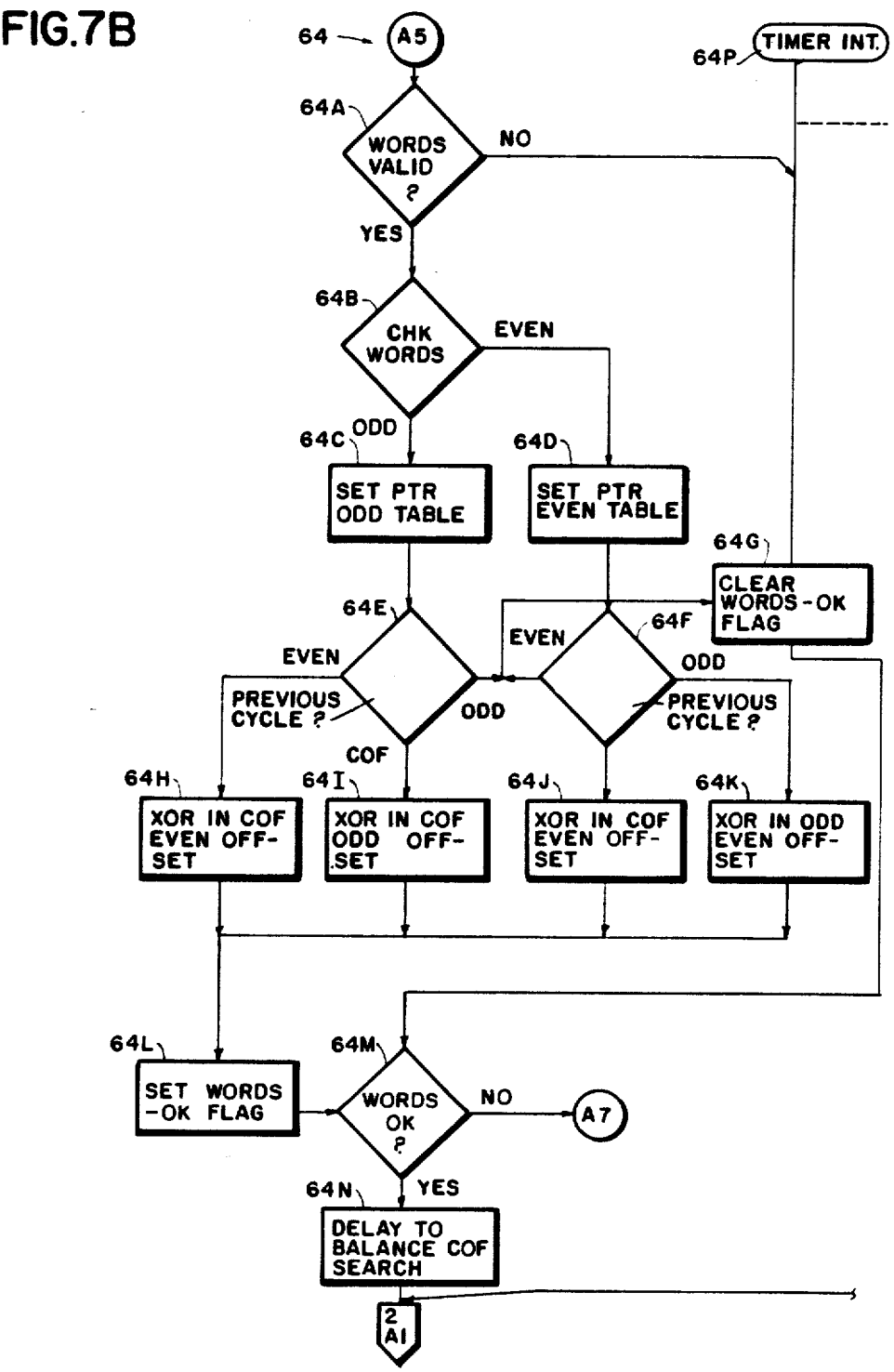
Figure 7C:
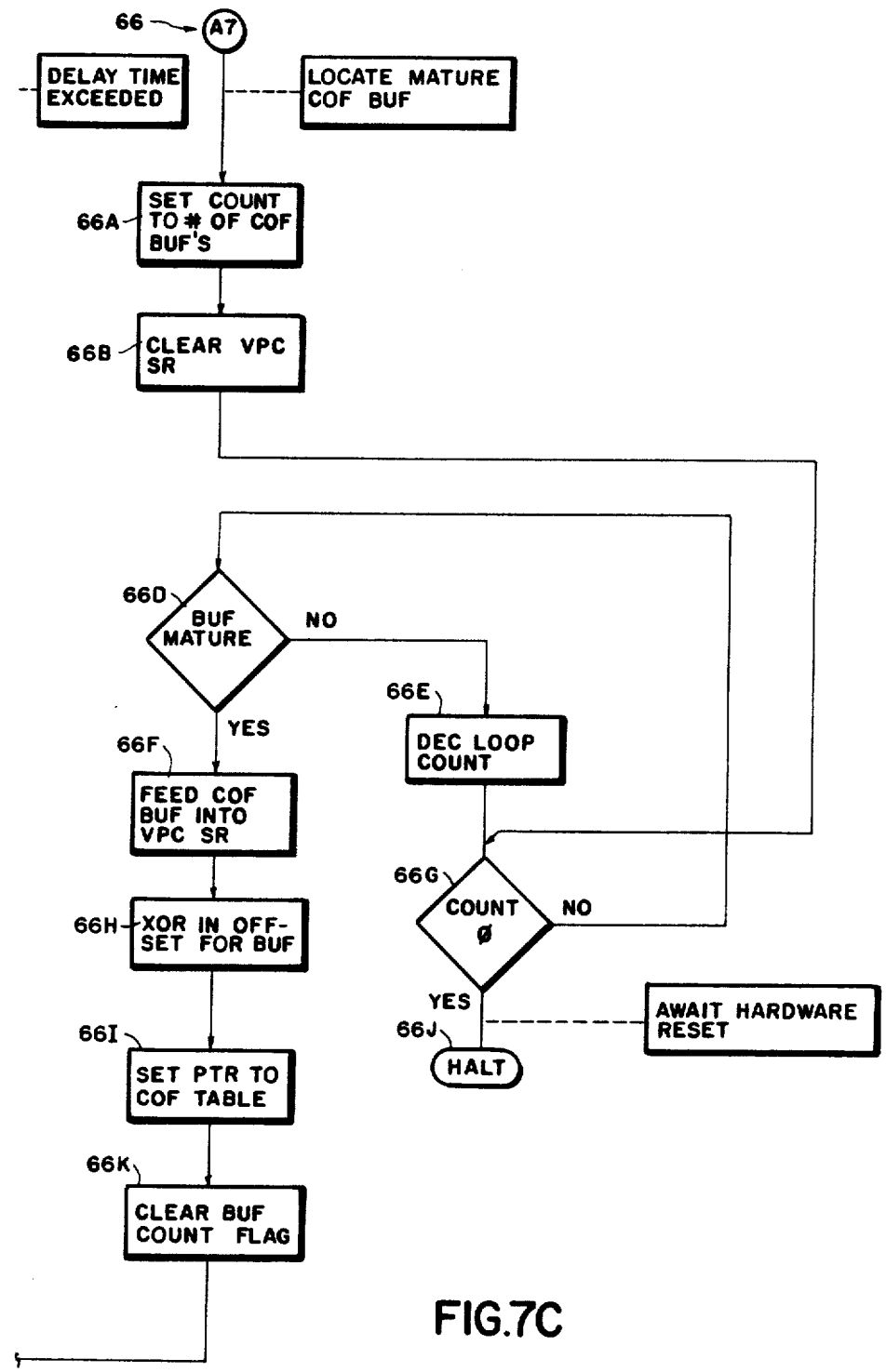
Figure 8A:
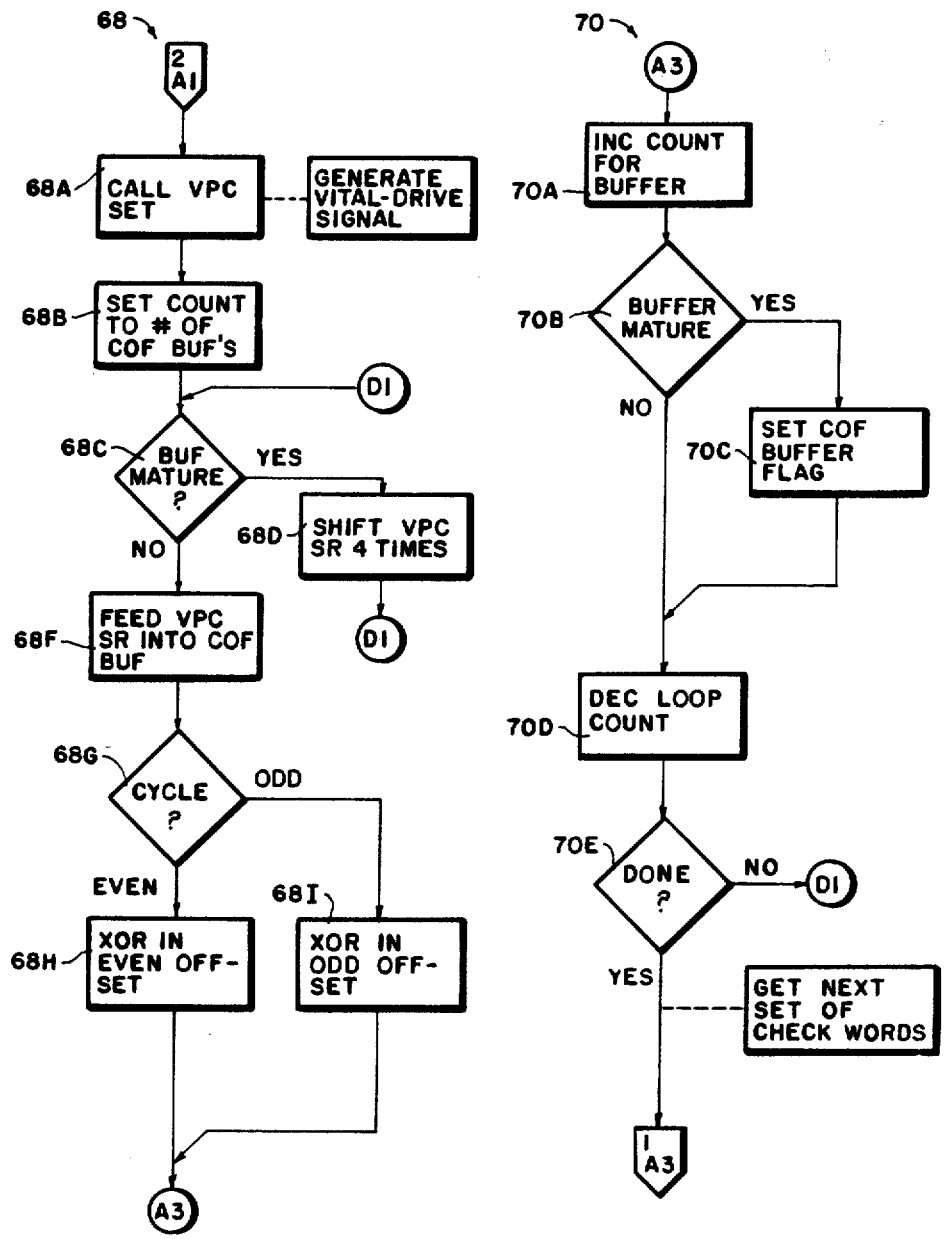
Figure 8B:
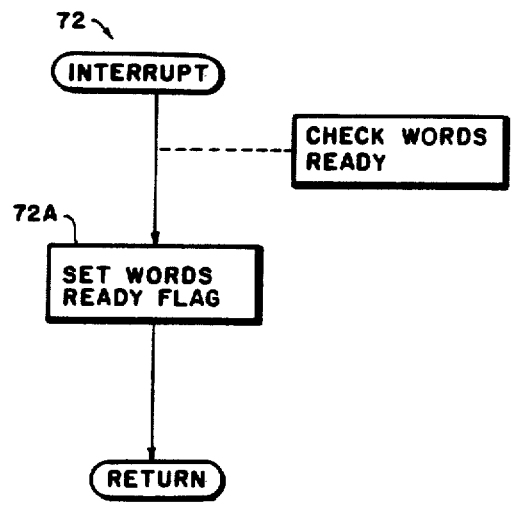

FIGS. 7 and 8 provide an overview of the VPC software. The flowcharts seen therein are labelled with section numbers 60–72. As the result of a hardware reset, the internal memory of microcontroller U2 is first cleared (step 60A) and the hardware is reset (60B). The vital delay (60C) is then run and the result is used to initialize the VPC shift register 20. The COF buffers are initialized (60D) from a table of COF initialization constants. This completes the system reinitialization following a reset and a branch is taken (C3) into the main program loop (step 62B), to begin the reception and processing of checkwords.

Normally, the process of receiving a new checkword set is begun by loading and starting a timer (62A) which interrupts the processor if the wait for checkwords becomes too long. This timer terminates the wait and allows the system to attempt to use a COF buffer if one is available.

On system startup, no COF buffers will be mature; therefore, the wait continues until checkwords are received or a hardware reset occurs. A flag is set under interrupt control which indicates that a new checkword set is ready (62B). When this happens, the VPC puts its address onto the system bus (62C) to signal that it is ready to receive checkwords. A loop counter is set to the expected number of bytes, and the validation buffer is cleared (62D).

When the first byte is received (62 E, F, G), its most significant bit indicates if the set is odd or even, and flags are set accordingly (62H). As each byte is received, it is fed into both the validation buffer (62I) and the VPC shift register 20 (62J). When all bytes have been received (62K and 62L), the validation buffer is examined to see if the checkwords appear to be valid (64A). If the words are not valid, or if the interrupt timer times out before the process is complete (64P), the reception process is stopped and the checkwords are flagged not valid (64G). If the words are valid, the table pointer is set up to the odd or even table depending upon the type checkword set just received (64B, C, and D). Then a test is made to compare the previous cycle to the nature of the checkword set just received (64 E and F). If an invalid condition is detected (odd followed by odd or even by even), the words-OK flag is cleared (64G). If the sequence appears correct (odd followed by even, even by odd, or COF by either), a corresponding offset value ODD, EVEN or COF is x-ORed to the VPC-shift register depending upon the nature of the new check word set and the previous cycle (64H, I, J, K). As a result, the words-OK flag is set (64L).

Next the words-OK flag is tested (64M), and if the checkword set is not valid, an attempt is made to find a mature COF buffer (66A–J). Otherwise a delay is run (64N) to balance the time which would be consumed in this search which will now be discussed.

The VPC shift register is cleared (66B) and a loop count (66A) is set to the number of buffers in the system. If no buffers are used (66C), the process halts (66J) immediately because the parameters indicate no forgiveness. Otherwise, the flag of each buffer (66D) is tested until a mature buffer is found. If all flags are tested (66E, 66C) and none is found to be mature, the processor halts and awaits reset (66J). When a mature buffer is found, its contents are fed into the VPC shift register (66F) and a corresponding offset (66G) from ROM is exclusive-ORed into the register which then contains the correct initial value for a COF cycle. The flag for that buffer is cleared (66I) and its count is set to zero (66I) to indicate that it requires maturing. The pointer is set to the first entry in the COF table (66H).

Whenever either valid checkwords are received, or a cycle of forgiveness is used, a call is then made to VPCSET (68A). This causes the two routines VPCSET (26A–26H) and VPCCLR (28A–28H) to toggle back and forth generating the vital-drive signal and toggling the reset hold of (26B and 28B).

A return from either of these routines leads to the portion of the program which matures COF buffers (66B). A loop count is set to the number of COF buffers 68D.

Each buffer flag is examined (68C) to see if the buffer is mature. If it is, the VPC shift register is shifted four times (68D) to simulate the operation which would occur during the maturing operation. If the buffer is not mature, the contents to the VPC shift register is shifted into the COF buffer (68F). Then depending upon whether the cycle was odd or even (68G), an offset constant from ROM is exclusive-ORed into the buffer (68H and I). The count for the buffer is then incremented and tested (70A and B) to see if the buffer has reached maturity on this cycle. If the buffer has become mature, its flag is set to stop further processing (70C); otherwise no action is taken and the maturing process will continue on subsequent cycles. Finally, the loop count is decremented to see if all buffers have been tested and matured as required (70D and E). If the process is not complete, it proceeds with the next buffer (68C). If it is complete, a branch is taken back to the beginning of the program loop to await the next checkword set (62A).

SAFETY

The safety of this device relies upon the fact that the VPC shift register must contain one of a limited set of values in order for the VPC to be capable of creating the vital drive signal required to produce vital power. In order to create this signal, the value in the VPC shift register musty correspond to the table entry selected by the table pointer. Since the VPC shift register contains N bits, it can take on $2^{}N$ values. Since only one of these values is valid for the table entry selected by the table pointer, the probability of getting this value by means other than the reception of a valid checkword set or by the use of a COF buffer is $1/2^{}N$ If $N=32$, this probability is approximately one chance in four billion. This probability can be made arbitrarily small by increasing N.

RECAPITULATION OF THE INVENTION

It will now be thoroughly appreciated that the vital power controller of the present invention, by providing a forgiveness feature, allows the VPC to tolerate an occasional bad checkword set and to continue to provide vital power if the rate at which bad checkword sets are encountered is below a specified rate. Accordingly, the novel design makes the system more tolerant to noise in that it can be tailored to continue to function when those occasional bad checkword sets are encountered. By using a feedback shift register and a ROM table to generate the vital power output, it is very easy to implement the concept in software and at the same time the system is very flexible.

From the description, it will be clear that a valid checkword set authorizes the production of the vital power output for a limited time, this time being determined by the number of available ROM table entries. This time can be increased or decreased by adding or deleting ROM table entries. Also, the vital output signal need not be a simple square wave as described herein. By changing the ROM table, the vital drive signal can be changed to be a modulated signal or any desired signal which the analog circuitry is designed to recognize. Accordingly, both the time change and the signal waveform change can be made with no changes in the basic program for the VPC. Instead, only the ROM table data need be modified.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in t he appended claims all such modifications as fall within the true spirit and scope of the invention.

We claim:

1. A vital power controller for verifying the proper operation of a vital processing system and for providing vital power to the system outputs only when the system is functioning correctly comprising:
   (1) a microprocessor adapted to receive odd and even checkword sets, and including means for converting the checkword sets so as to produce a vital drive signal at an output of said microprocessor;
   (2) a passive detector for receiving said vital drive signal at its input and providing a low power DC voltage at its output;
   (3) a DC-to-DC converter for receiving said low power DC voltage at its input and providing vital power at its output;
   (4) said means for converting said checkword sets including a feedback shift register, a read-only memory having odd and even tables stored therein, whereby a valid checkword set enables the vital power controller to generate said vital power for a time limited by the number of entries in said tables; and
   (5) means for discriminating between noise events occurring at a relatively low rate compared with the rate encountered with hardware failures, said means for discriminating including a plurality of forgiveness buffers connected to said feedback shift register, each of said buffers being operative to initialize said feedback shift register for generating said vital drive signal for a period equivalent to that for a valid checkword set.

2. A device as defined in claim 1, in which each of said forgiveness buffers is configured as a polynomial divider.

3. A vital power controller as defined in claim 1, in which said read-only memory in said means for converting contains a forgiveness table for operating said vital power controller during cycles of forgiveness such that these cycles cannot be confused with the normal odd or even checkword cycles.

4. A device as defined in claim 3, further comprising means for destroying the contents of each forgiveness buffer when such buffer has been used in the cycle of forgiveness process.

5. A device as defined in claim 1, in which each of said forgiveness buffers is first initialized to a value taken from a table of cycle of forgiveness initialization values.

6. A device as defined in claim 5, including means for feeding the final state of said feedback shift register into a forgiveness buffer each time a valid odd or even checkword set is processed, thereby to change each buffer state so that after a fixed number of valid checkword cycles, the forgiveness buffer will contain the value which can be used to provide a cycle of forgiveness.

7. A device as defined in claim 1, in which each of said cycle of forgiveness buffers is first initialized to a value taken from a table of cycle of forgiveness initialization values.

8. A device as defined in claim 7, including means for feeding the final state of said feedback shift register into a forgiveness buffer each time a valid odd or even checkword set is processed, thereby to change each buffer state, so that after a fixed number of valid checkword cycles, the forgiveness buffer will contain the values which can be used to provide a cycle of forgiveness.

9. A vital power controller, a vital power controller for verifying the proper operation of a vital processing system and for providing vital power to the system outputs only when the system is functioning correctly comprising:
   (1) a microprocessor adapted to receive odd and even checkword sets, and including means for converting the checkword sets so as to produce a vital drive signal at an output of said microprocessor;
   (2) a passive detector for receiving said vital drive signal at its input and providing a low power DC voltage at its output;
   (3) a DC-to-DC converter for receiving said low power DC voltage at its input and providing vital power at its output;
   the improvement comprising an arrangement in which said microprocessor includes: (a) a feedback shift register as part of said means for converting; a read-only memory having odd and even tables stored therein, whereby a valid checkword set enables the vital power controller to generate said vital power for a time limited by the number of entries in said tables; and (b) means for discriminating between noise events occurring at a relatively low rate compared with the rate encountered with hardware failures, said means for discriminating including a plurality of forgiveness buffers connected to said feedback shift register, said buffers being selectively operative to initialize said feedback shift register for generating said vital drive signal for a period equivalent to that for a valid checkword set.

10. A device as defined in claim 9, in which each of said cycle of forgiveness buffers is configured as a polynomial divider.

11. A vital power controller as defined in claim 9, in which said read-only memory in said means for converting contains a forgiveness table for operating said vital power controller during cycles of forgiveness such that these cycles cannot be confused with the normal odd or even checkword cycles.

12. A device as defined in claim 11, further comprising means for destroying the contents of each forgiveness buffer when such buffer has been used in the cycle of forgiveness process.

* * * * *